UNITED STATES PATENT OFFICE.

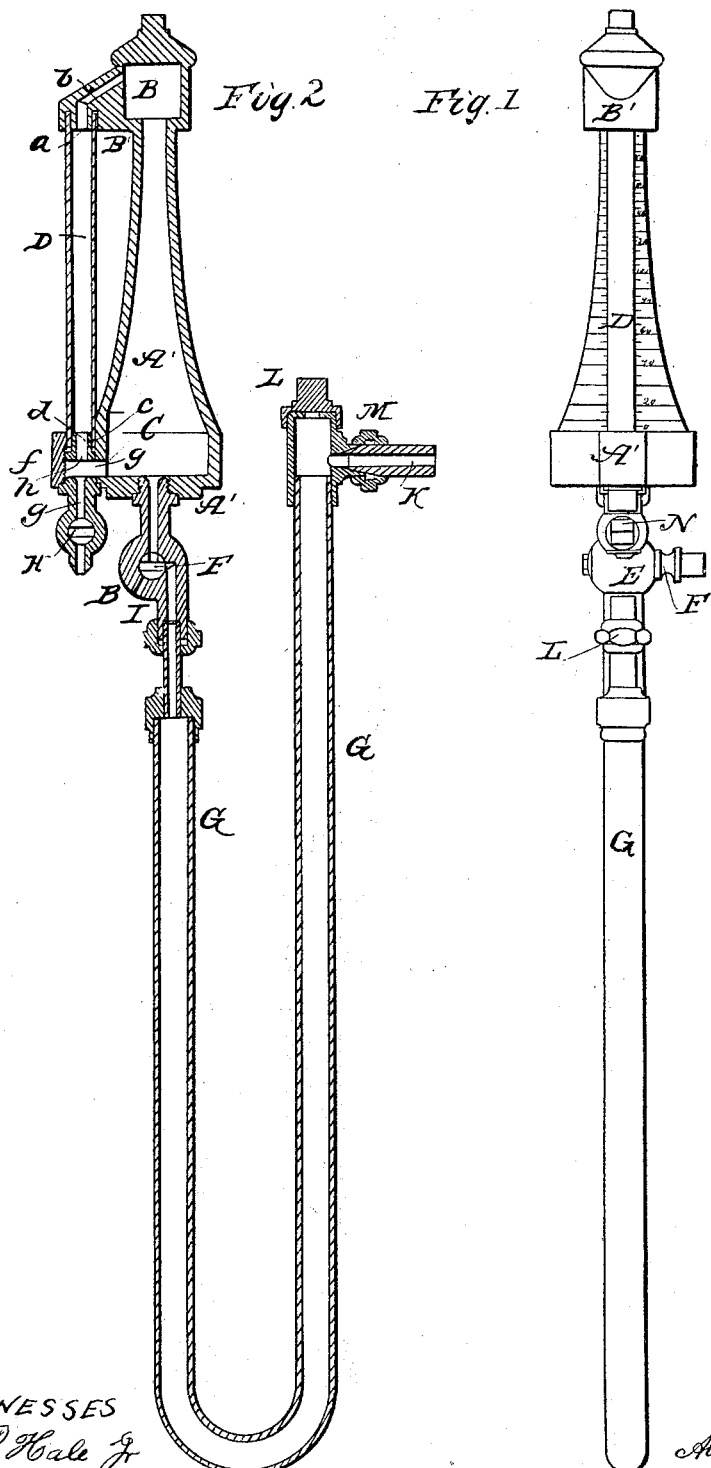

ALEXANDER ALLAN, OF PERTH, SCOTLAND.

IMPROVEMENT IN PRESSURE-GAGES.

Specification forming part of Letters Patent No. 45,010, dated November 15, 1864.

*To all whom it may concern:*

Be it known that I, ALEXANDER ALLAN, a resident of Perth, county of Perth, Scotland, have invented an Improved Pressure-Gage; and I do hereby declare the same to be fully described in the following specification and represented in the accompanying drawings, of which—

Figure 1 denotes a side elevation, and Fig. 2 a longitudinal and vertical section, of such gage.

This invention is a pressure-indicating apparatus, whereby a measured volume of air or gas is made to act the part usually performed in pressure-gages by a metallic or other spring, the apparatus being so constructed as to enable the volume of air to be immediately and exactly renewed at pleasure.

The gage, as hereinafter more particularly explained, consists, principally, of an inverted bent or siphon-tube and a chamber of peculiar form, such chamber being of greater capacity or width at bottom, and reduced by a curve or by approaching curves extending from such bottom upward to or nearly to the apex or top of the chamber, the same being so that the divisions of pressure on the graduated scale may be equidistant, or about so, when indicating equal increments of pressure. The said chamber is provided with a means by which the volume of air as well as that of water necessary to the correct working of the apparatus may be renewed and established at pleasure.

In its improved construction that part of the gage in which the measuring-chamber is situated in composed of metal such as will not readily oxidize by contact with water. To tubular extensions or branches therefrom a glass tube is applied, the bore of such tube being made to freely communicate at its ends with the top and bottom of the air-measuring or gage chamber.

A three-way cock is arranged between the top of one leg of the siphon-tube and the bottom of the gage-chamber, such cock having passages by which communication may be made between the gage-chamber and the atmosphere, or between the gage-chamber and the bore of the siphon-tube, or between the said bore and the atmosphere.

Other appliances to the gage will be hereinafter described. It may be modified in form from what is herein specified and still operate on the same principle or maintain those characteristic features by which it is distinguished from other pressure gages. The principle on which it operates consists in making use of a measured volume of air, acted on directly by water or other liquid contained in a siphon or bent tube, or its equivalent, and pressed on by steam or an elastic medium whose pressure is to measured or determined.

The principal features of the invention consist in the construction of the gage as above described, and more especially with the metallic measuring-chamber having a glass index-tube or a glazed slot connected with it, through which (tube or slot) the degree of compression of the air may be observable by the height of water within the tube or against the glazing of the slot, a graduated scale being applied in conjunction with the tube to indicate the amount of pressure appertaining to any height of water which may be represented by the tube or glazing.

A mechanical equivalent to the glass tube applied to the air-chamber would be a glass tube similarly applied to and separate from the longer leg of the siphon-tube; but this construction of the apparatus I do not deem so useful and valuable as that wherein the glass tube is employed in direct connection with the air-chamber. In case of the application of the glass index-tube to the longer leg of the siphon-tube, the descent of water within the said leg would be followed by a corresponding descent of water in the glass tube, such serving to indicate the pressure or the degree of contraction of the air within the gage-chamber.

In the accompanying drawings, A denotes the measuring-chamber as made in a metallic standard, A', having passages B and C, which connect the chamber at its top and bottom with a glass or transparent tube, D, which at its upper end receives a hollow teat or projection, *a*, and abuts against a leather washer, *b*, which surrounds the said teat or projection, the latter making part of an extension, B', of the standard A'. The lower end of the glass tube abuts against another leather or elastic cushion, *c*, which encompasses the projection *d* of a tubular screw, *e*, which screws up into a female screw, *f*, formed in a cylindrical chamber, *g*, communicating with the chamber A by the passage C. The screw $e$ is made with a transverse groove, $h$, for reception of the end of a screw-driver when used for rotating the screw for the purpose of either screwing it upward or downward within the chamber $g$.

A vent-cock, H, for admitting air into the gage-chamber A, is screwed into the lower part of the chamber $g$.

G is the siphon-tube, or a tube formed or bent and arranged with respect to the air-chamber A as shown in the drawings.

E represents a three-way cock arranged between the gage-chamber and the siphon-tube, and having its key F in the position in which it should be while the apparatus may be in operation. The tube G should be capable of holding a greater amount of liquid than the gage chamber. In general, the amount of liquid within the tube should be more than twice the amount which the gage-chamber can be made to contain.

At its upper end the siphon-tube G is furnished with a removable screw-cap, L, which screws on the tube, and may be taken off the same in order to enable such tube to be supplied with water. The siphon-tube, by means of a conduit, K, connected with it by a suitable connection, M, may connect with a steam-boiler or any vessel containing steam or other elastic medium whose pressure it may be desirable to determine by the apparatus.

The gage may be adjusted by turning the key F of the three-way cock E so as to open a clear way between the chamber A and the atmosphere at I, the vent-cock H being also opened. When the gage-chamber may have been emptied of liquid, the cock H must be shut, and the key F of the cock E should be turned so as to open communication between the gage-chamber and the siphon-tube.

The operation of the apparatus will be as follows: Pressure being made on the liquid in the longer arm of the siphon-tube will depress it, and consequently elevate the liquid in the shorter arm, which, entering the gage-chamber, will compress the air therein to a density the force of which shall correspond exactly with that of the pressure. The surface of the liquid in the glass tube D will be on a level with that in the chamber A and serve as an indicator of the pressure, the amount of which may be ascertained by a scale of divisions made either on or placed against the tube or arranged on the outer surface of the standard A', as shown in Fig. 1.

Were the standard A' made of glass or a transparent material, it would be liable to be easily broken while in use. By constructing it of metal, and combining with it and the siphon tube a glass tube, arranged with respect to the chamber A substantially as specified, the apparatus is not so liable to injury, and, besides, is better in various other respects.

Having thus explained my said pressure-gage, what I claim thereof as of my invention is as follows, viz:

1. The pressure-gage, as composed of the siphon-tube G, the non-transparent vessel A, and the transparent glass tube D, or its equivalent, arrranged and connected substantially as described.

2. The means of fixing the glass tube in place, with tight joints at its ends, the same being effected by the tubular screw-nut $e$, the female screw $f$, co-operating washers $b$ and $c$, and the extension B', the whole being arranged substantially as hereinbefore described.

ALEXANDER ALLAN.

Witnesses:
STEPHEN ALLEY,
EDMUND HUNT.